(No Model.)
A. HAID.
SECONDARY BATTERY.
No. 296,164.  Patented Apr. 1, 1884.
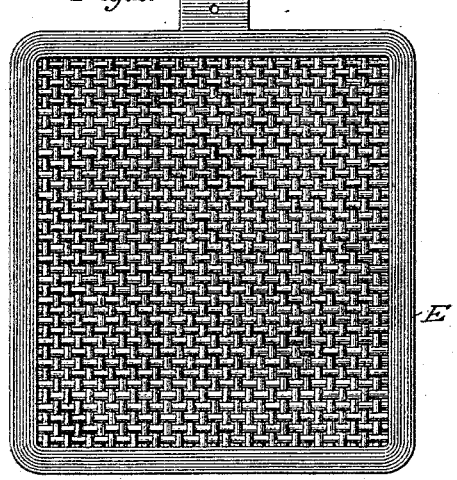
Fig. 2.
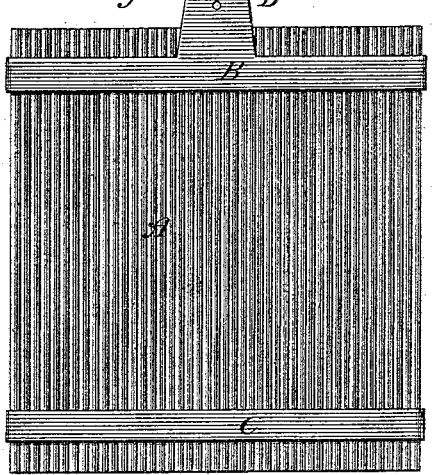
Fig. 1.
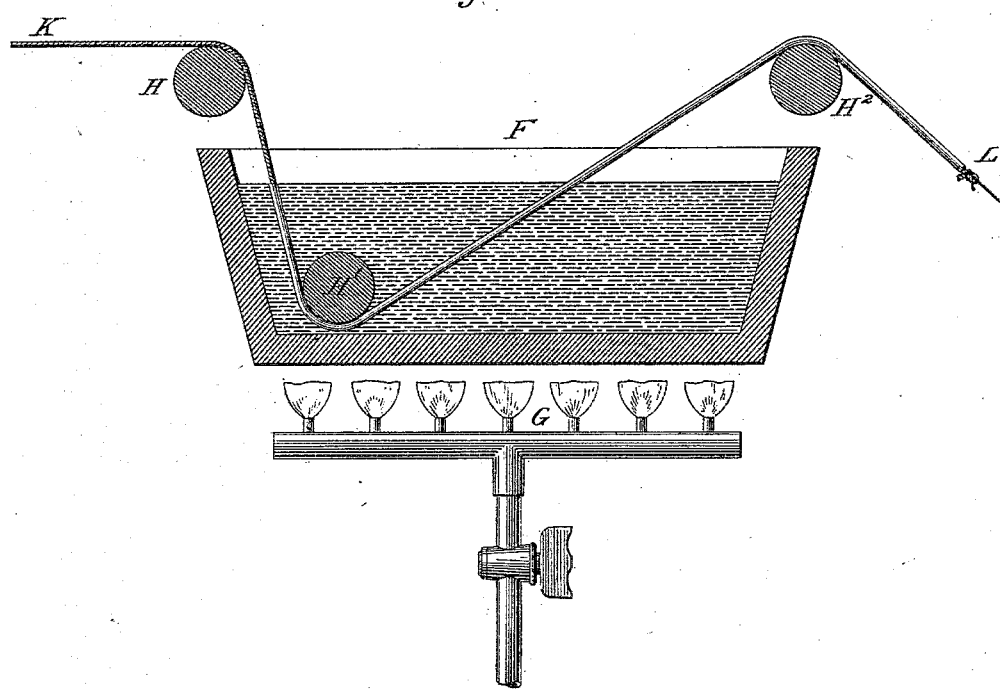
Fig. 3.
Fig. 4.
Attest:
Raymond F. Barnes
W. H. Doggett
Inventor:
Alfred Haid
by Preston W. Page
atty.

UNITED STATES PATENT OFFICE.

ALFRED HAID, OF RAHWAY, ASSIGNOR TO HAID'S ELECTRICAL STORAGE COMPANY, OF NEWARK, NEW JERSEY.

SECONDARY BATTERY.

SPECIFICATION forming part of Letters Patent No. 296,164, dated April 1, 1884.

Application filed December 29, 1883. (No model.)

*To all whom it may concern:*

Be it known that I, ALFRED HAID, a subject of the Emperor of Germany, and a resident of Rahway, in the county of Union and State of New Jersey, have invented certain new and useful Improvements in Secondary Batteries, of which the following is a specification, reference being had to the drawings accompanying and forming a part of the same.

My invention relates to secondary or storage batteries, the improvements forming the subject of said invention being directed to the improvement of the electrodes of such batteries, the object being to obtain a more durable form of electrodes, which present a greater amount of active or useful surface for a given mass than those heretofore in use. The electrodes of secondary batteries are usually composed of lead. This metal has been used in the form of sheets; or the electrodes have been made up of a multiplicity of ribbons, wires, or pieces of lead, some means being employed for holding or binding the same together. In lieu of lead in a pure metallic state, oxides of the same, and also other conducting materials, have been employed in making the electrodes. In describing my invention, however, I shall refer generally to lead in a pure state, though I do not desire to limit myself to this alone, as under certain circumstances, which will be apparent to those skilled in the art, alloys of lead or other metals may be employed, with the attainment of results of the same kind. The electrodes which form the subject of my invention are made up of an assemblage of wires, strands, or threads, composed of a fibrous core with a coating of lead or its equivalent, and bound up in the form of a brush or bundle, as will be more fully hereinafter set forth.

In the accompanying drawings, Figure 1 represents the form of electrode which I prefer. Fig. 2 is a modified form of electrode. Fig. 3 illustrates in section an apparatus for making the strands for the electrodes, and Fig. 4 is a sectional view of a portion of a strand made by the apparatus.

In Fig. 1, A designates a number of wires or threads composed in part of oxidizable metal, such as lead. In the description and claims I shall employ the term "strands" to designate these wires or threads, meaning by such term not solid wires or hollow tubes of metal, but composite threads or cords. Any desired number of the strands are laid together and bound in the shape desired for the electrode by bands or strips B C, preferably of the same metal as that forming the strands. The upper band, B, may have one or more ears, D, for supporting the electrode and making the electrical connections. The lower band, C, may be dispensed with, the electrodes being then in the form of a tassel.

Fig. 2 shows another arrangement of the strands. The electrode in this case is made by forming the strands into a net or fabric having a reticulated surface. A band, E, of suitable metal, may be applied to the edges of the electrode for holding it and making the electrical connection. The strands A are composed of a fibrous core with lead coating, such as results from drawing thread or twine through molten lead.

I have illustrated a device in Fig. 3 by means of which I coat the twine for this purpose. F is a receptable for containing the lead; G, a series of gas-jets for applying the requisite heat. H H' H'' are rollers around which the twine passes, roller H' being near the bottom of the receptacle. A quantity of lead being melted in the receptacle F and kept at as low a temperature as practicable, one or more threads or cords, K, of cotton, linen, or the like, are drawn by a wire, L, under the roller H' and through the lead over roller H''. The thread or cord as it passes through the lead takes up a coating of the same, which hardens at once, forming a surface which particularly adapts it for use in making secondary-battery electrodes. The thread is then cut up into the desired lengths, or made up into the electrodes in any convenient manner. Other ways of applying a conducting-coating to the threads or cords have been devised by me. For example, twine or thread may be coated with graphite or like material, and the lead coating applied by electro-deposition; or the twine may be soaked in a soluble lead compound—such as acetate of lead—then immersed in oxalic acid, then washed and dried, and afterward heated, by which suboxide of lead is formed on the surface and in the interstices of the twine.

Having now described my invention and the best way of which I am aware in which the same is or may be carried into effect, I would state that I do not consider the invention as limited to the specified arrangement of the strands composing the electrodes.

I am aware that electrodes have been heretofore made up of separate wires, strips, or pieces of lead, and that electrodes have been formed by coating fibrous materials with an oxidizable compound, and such I do not claim. By using strands composed of a fibrous core and lead coating, however, I produce an electrode which is durable, cheap, and very efficient.

Having now described my invention, what I claim is—

1. An electrode for secondary batteries, composed of an assemblage of strands consisting of threads or cords of fibrous material, coated or covered with lead or its equivalent, as set forth.

2. The method herein described of manufacturing the electrodes for secondary batteries, which consists in coating twine or cord with an oxidizable conductor, cutting the same into the required lengths, and binding them together, substantially as set forth.

In testimony whereof I have hereunto set my hand this 12th day of December, 1883.

ALFRED HAID.

Witnesses:
W. H. HARTLEY,
W. FRISBY.